Aug. 30, 1960   A. J. FILITI ET AL   2,950,693
APPARATUS FOR FORMING DOUGH PRODUCTS
Filed Nov. 18, 1958   2 Sheets-Sheet 1
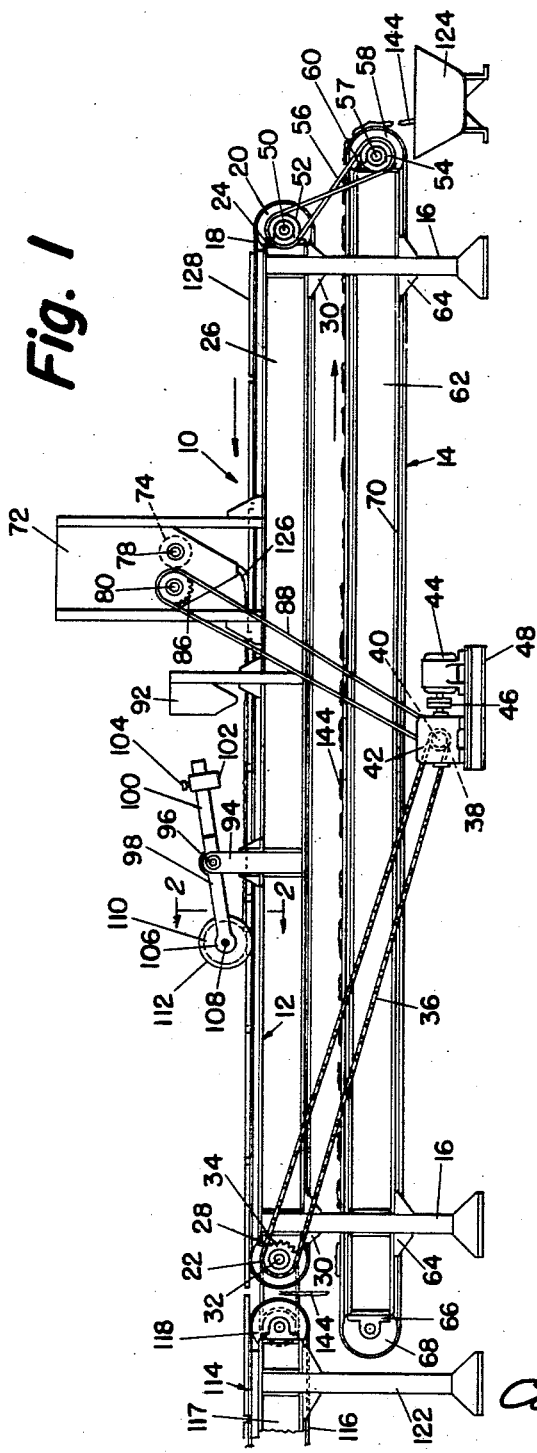
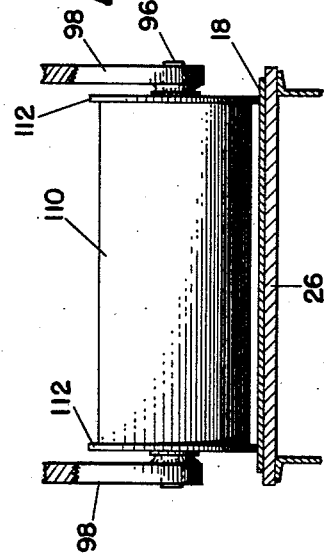
INVENTORS
ANTHONY J. FILITI
JOHN GILCHRIST
BY
Caesar and Rivise
ATTORNEYS.

Aug. 30, 1960   A. J. FILITI ET AL   2,950,693
APPARATUS FOR FORMING DOUGH PRODUCTS
Filed Nov. 18, 1958   2 Sheets-Sheet 2
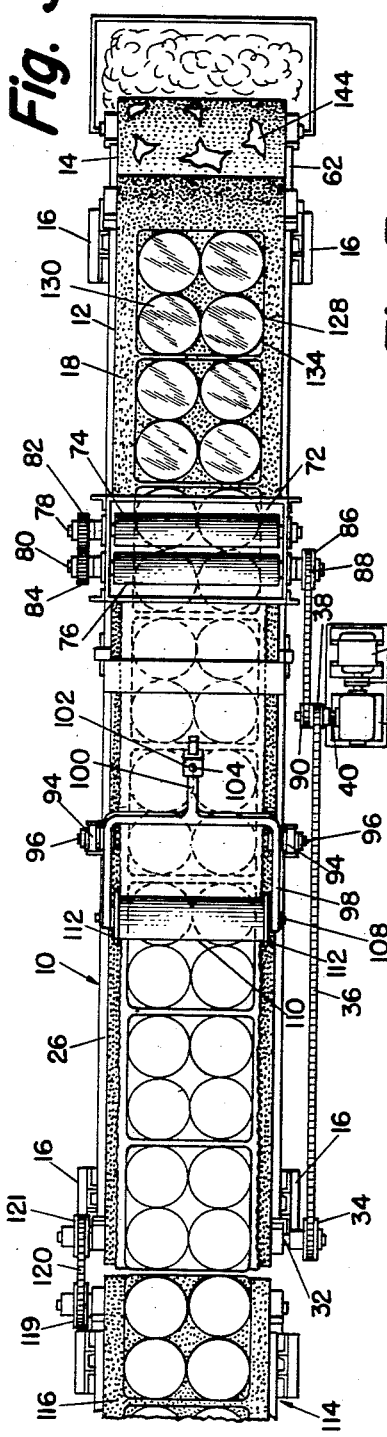
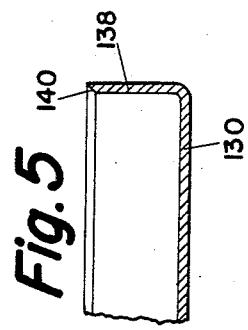
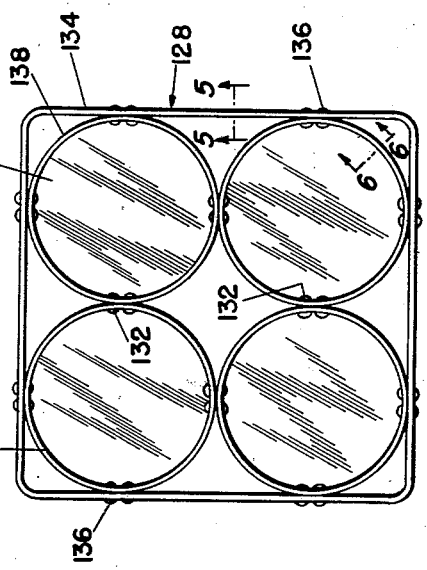
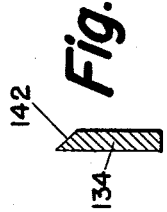
INVENTORS
ANTHONY J. FILITI
JOHN GILCHRIST
BY
Caesar and Rivise
ATTORNEYS

United States Patent Office 2,950,693
Patented Aug. 30, 1960

2,950,693

APPARATUS FOR FORMING DOUGH PRODUCTS

Anthony J. Filiti, Philadelphia, and John Gilchrist, Roslyn, Pa.; said Gilchrist assignor to Anthony J. Filiti, trading as Delco Quality Foods, Philadelphia, Pa.

Filed Nov. 18, 1958, Ser. No. 774,653

10 Claims. (Cl. 107—4)

This invention relates to apparatus for use in a molding and baking process, and it particularly relates to the making of pizza pies and similar products.

In the making of baked products, particularly pizza pies and the like, it has heretofore been the general practice to place the dough in individual pans, and then trim and shape the dough by hand prior to placing it in the oven. This is obviously a time-consuming and tedious method especially when large production quotas are involved. Furthermore, the dough used for pizza pies and the like is so sticky and crumbly that it cannot be readily manipulated in sheet form by hand. In addition, the hand manipulation results in non-uniformity in the final products.

It is one object of the present invention to overcome the above and other disadvantages of the prior methods by providing apparatus for forming dough products which eliminates the necessity for any manual manipulation of the dough during forming and trimming.

Another object of the present invention is to provide apparatus of the above type which is capable of producing the formed and trimmed dough rapidly and in relatively large quantities whereby mass production methods can be employed.

Another object of the present invention is to provide an apparatus for forming dough products which is simple, yet sturdy, in construction, and which is relatively inexpensive to manufacture.

Another object of the present invention is to provide an apparatus of the above type which is simple to operate and does not require the services of highly skilled workers.

Other objects and many of the attendant advantages of this invention will be readily appreciated as the same becomes better understood by reference to the following detailed description when considered in connection with the accompanying drawings wherein:

Fig. 1 is a side elevational view of a device embodying the present invention.

Fig. 2 is a sectional view taken on line 2—2 of Fig. 1.

Fig. 3 is a top plan view of the device of Fig. 1.

Fig. 4 is a top plan view of a pan assembly used in conjunction with the device of Fig. 1.

Fig. 5 is a sectional view taken on line 5—5 of Fig. 4.

Fig. 6 is a sectional view taken on line 6—6 of Fig. 4.

Referring now in greater detail to the various figures of the drawings wherein similar reference characters refer to similar parts, there is shown a forming and trimming device, generally designated 10, comprising an upper horizontal conveyor 12 and a lower horizontal conveyor 14; the lower conveyor extending beyond the upper conveyor at each end thereof. Both of the conveyors 12 and 14 are supported by standards 16.

The upper conveyor 12 comprises an endless belt 18 movable about a pair of oppositely positioned pulleys 20 and 22; the pulley 20 being mounted for rotation on a bracket 24 extending from one end of a horizontal frame 26 and the pulley 22 being mounted for rotation on a bracket 28 extending from the opposite end of frame 26. The frame 26, in the form of an elongated rail or table, is supported at each end by brackets 30 connected to the standards 16 and supporting the frame at opposite edges thereof.

The pulley 20 is a driven pulley while the pulley 22 constitutes the driving pulley and is mounted on a shaft 32 on which is also mounted a sprocket 34. This sprocket 34 is engaged by a drive chain 36 which is also engaged with a sprocket 38 mounted on a shaft 40 extending laterally from a gear box 42. An ordinary gear assembly is provided in gear box 42 to operatively connect shaft 40 with the motor shaft of motor 44 through a clutch means 46. The gear box 42 and motor 44 are shown mounted on a common base 48.

The pulley 20, which is driven by the pulley 22 through belt 18, is mounted on a shaft 50 coaxially with a pulley 52. This pulley 52 is operatively connected to a drive pulley 54 by means of a twisted belt 56. The pulley 54 is mounted on a shaft 57 coaxially with a pulley 58; the shaft 57 being supported for rotation in a bracket 60 extending from the corresponding end of a horizontal frame or table 62. This frame 62 is also supported by brackets 64 on the standards 16 in similar manner to frame 26 and is provided with a bracket 66 on its opposite end on which is rotatably mounted a driven pulley 68. A belt 70 moves around the pulleys 58 and 68, this assembly constituting the lower conveyor 14.

Mounted on frame 26 is a feed hopper 72 into which is adapted to be placed a quantity of dough. At the lower end of this hopper is an extrusion slot or nozzle extending transversely across the width of the belt 12. Within the hopper, above the nozzle, are a pair of feed rollers 74 and 76 mounted on shafts 78 and 80. The roller 74 is a driven roller which is driven by drive roller 76 through a gear 82 in mesh with a gear 84 coaxial with roller 76. The roller 76 is actuated by means of a coaxial sprocket 86 engaged with a drive chain 88 which is, in turn, engaged with a sprocket 90 operatively connected to the gearing in gear box 42.

Also mounted on frame 26, rearwardly of feed hopper 72, is an oil trough 92 having a transverse slot or nozzle at its lower end extending across the width of the belt 12.

To the rear of the trough 92, the frame 26 has connected to either side thereof a post 94 which extends upwardly above the belt 12. Each of these posts is provided with a bearing portion at its upper end and in each bearing portion is provided a pivot pin 96. The pivot pins 96 rockably support opposite arms of a fork member 98. At the center of the bridge portion of the fork member 98 there is integrally provided a rod 100 having a counterweight 102 adjustable longitudinally thereof. The counterweight 102 is provided with a vertical opening intersecting the bore through which the rod 100 extends, and in this opening is releasably positioned a locking pin 104 by means of which the counterweight may be held in its various positions of adjustment.

At the rearward portion of the fork member 98, bearings 106 are provided at the end of each arm and these bearings support a shaft 108 on which is mounted a pressure roller 110 constructed of live rubber. This roller 110 is provided with a flange 112 at each end; these flanges 112 being engaged with the conveyor belt 18 and being acted upon thereby to rotate the roller 110 in conjunction with the conveyor belt.

Spaced rearwardly from the rear end of conveyor 12 and in the same horizontal plane therewith is a conveyor 114 comprising a belt 116 movable around a frame 117 between pulleys such as indicated at 118, all similar to conveyor 12. The pulley 118 is mounted coaxial with a sprocket 119 which is engaged with a drive chain 120. The chain 120 is also engaged with a sprocket 121 on the shaft 32 whereby simultaneous motion is provided between the conveyors 12 and 114. The frame 117 is also supported by standards 122 in similar manner to frame 26.

The conveyor 114 is provided for moving the pans containing the formed dough products to the oven or such other treating station as may be required. However, before the pans move onto the conveyor 114, all trimmings (constituting any excess of dough sheared off the pans in a manner to be presently described) fall down into the space between the conveyors 12 and 114 onto the conveyor 14. The conveyor 14, because of the twist in the drive belt 56, moves in an opposite direction from conveyor 12 and therefore carries the trimmings back to a hopper 124 from where they may be collected and returned into the feed hopper 72 for re-use.

In operation, the dough indicated at 126, is fed in a continuous sheet or strip from the hopper 72 onto a series of molds on the conveyor belt 18. These molds may be separably connected or entirely separate from the conveyor. These molds are preferably bake-pans or bake-pan units such as shown at 128.

The bake-pan units 128 each comprises a set of four round pans 130 arranged tangentially to each other and secured together by welding or by other means such as the rivets shown at 132. A metal strap 134 of generally square or rectangular configuration encloses the four pans 130 and is connected thereto by welding or other means such as the rivets 136.

Each pan 130 has an upstanding peripheral wall 138, the upper edge of which is beveled to form a knife edge 140. Similarly, the upper edge of the strap 134 is beveled to form a knife edge 142.

As the sheet of dough falls onto the bake-pan units, both the bake-pan units and the dough covering them are fed, first beneath the trough 92 from which oil drops onto the dough, and then below the presser roller 110. The counterweight 102 is, by this time, adjusted to provide a pressure of the roller which will conform with the type of bake-pan being used and with the height of its cutting edge. This pressure is sufficient to press the dough down into the pans and to cause the knife edges 140 and 142 to shear off the excess as trimmings. At the same time, the weight of the roller is sufficiently counterbalanced by the counterweight 102 so that not only can the roller adjust itself to any small irregularities in the pans or dough but it will also not crush the hands, arms or any other part of the body of the operator if such part of his body were to be accidentally caught beneath the roller.

As the pans and oil-covered dough pass beneath the roller 110, there is no tendency for the oily dough to stick to the roller because of its rubber construction; as would otherwise be the case if the roller were made of metal or the like. This is an important consideration in the effective operation of the device.

After the pans and dough have passed beneath the roller 110 and the excess has been trimmed off, the pans containing the dough to be baked and the trimmings both pass over the pulley 22. The pans pass over the space between this pulley 22 and pulley 118 of the conveyor 114, whereas the trimmings, indicated at 144, fall onto the conveyor 14 and are conveyed to hopper 124 in the manner described above.

Obviously many modifications and variations of the present invention are possible in the light of the above teachings. It is, therefore, to be understood that within the scope of the appended claims, the invention may be practiced otherwise than as specifically described.

What is claimed as the invention is:

1. A dough forming assembly comprising a movable conveyor, a feed means for spreading a continuous strip of dough on said conveyor as it moves, a molding means on said conveyor adapted to underlie said strip of dough, cutting means on said molding means, a pressing means situated adjacent said conveyor and rearwardly of said feed means relative to the movement of said conveyor, said pressing means being biased into a position overlying said strip of dough and exerting pressure on said dough against said cutting means to sever said dough, and adjustable counterbalancing means connected to said pressing means.

2. The assembly of claim 1 wherein said pressing means comprises a roller mounted on a rockable support above the conveyor, and wherein said counterbalancing means comprises an arm on said support extending in an opposite direction from said roller and provided with a weight movable longitudinally thereof.

3. The assembly of claim 2 wherein said roller is provided with at least one end flange in operative engagement with said conveyor.

4. The assembly of claim 1 wherein said pressing means comprises a roller constructed of live rubber.

5. The assembly of claim 1 wherein said molding means comprise individual bake-pan units and wherein said cutting means comprise sharpened edges on said units.

6. The assembly of claim 1 wherein a second conveyor, operatively connected for movement in the same direction, is horizontally spaced from said first-mentioned conveyor, and wherein a third conveyor, operatively connected for movement in another direction, is situated below said first-mentioned conveyor.

7. The assembly of claim 1 wherein an oil dispensing means is positioned adjacent said conveyor between said feed means and said pressing means.

8. A dough forming assembly comprising a first conveyor including a horizontal frame with pulleys at opposite ends thereof and a conveyor belt movable around said pulleys and across the top and bottom of said frame, a second conveyor below said first conveyor and including a second horizontal frame with pulleys at opposite ends thereof and a conveyor belt movable around said pulleys and across the top and bottom of said second frame, said second conveyor extending horizontally beyond opposite ends of said first conveyor and the belt thereof being movable in opposite directions relative thereto, and a third conveyor including a third horizontal frame having pulleys at opposite ends thereof and a conveyor belt movable around said pulleys across the top and bottom of said third frame, said third conveyor being in substantially the same horizontal plane as said first conveyor but being horizontally spaced therefrom in end-to-end relationship, and the belt of said third conveyor being movable in the same direction as the belt of said first conveyor, said first conveyor having associated therewith a feed means constructed and arranged to extrude a continuous strip of dough longitudinally of the conveyor belt of said first conveyor, and an adjustably counterbalanced presser roller positioned to engage the upper flight of the belt of said first conveyor rearwardly of said feed means relative to the movement of said belt.

9. The dough forming assembly of claim 8 wherein said presser roller is constructed of live rubber.

10. The dough forming assembly of claim 8 wherein said presser roller is provided with at least one peripheral flange in engagement with said upper flight of the belt of said first conveyor.

References Cited in the file of this patent

UNITED STATES PATENTS

| | | |
|---|---|---|
| Re. 22,399 | Fonken | Dec. 7, 1943 |
| 1,701,850 | Holtzman | Feb. 12, 1929 |
| 1,805,706 | Rausch | May 19, 1931 |
| 2,021,597 | Frost | Nov. 19, 1935 |
| 2,453,599 | Schlegel | Nov. 9, 1948 |
| 2,495,236 | Goldstein | Jan. 10, 1950 |
| 2,734,465 | Head | Feb. 14, 1956 |